United States Patent
Duckwall

(10) Patent No.: US 6,266,334 B1
(45) Date of Patent: Jul. 24, 2001

(54) METHOD FOR OPTIMIZING ACKNOWLEDGE PACKET RATE

(75) Inventor: William Duckwall, Santa Cruz, CA (US)

(73) Assignee: Zayante, Inc., Scotts Valley, CA (US)

( * ) Notice: Subject to any disclaimer, the term of this patent is extended or adjusted under 35 U.S.C. 154(b) by 0 days.

(21) Appl. No.: 09/121,616

(22) Filed: Jul. 20, 1998

(51) Int. Cl.[7] ................................................. H04L 12/28
(52) U.S. Cl. ............................................ 370/397; 370/465
(58) Field of Search ................................. 370/397, 465; 714/748, 749

(56) References Cited

U.S. PATENT DOCUMENTS

| | | | |
|---|---|---|---|
| 4,616,359 | * 10/1986 | Fontenot | 370/397 |
| 5,495,481 | 2/1996 | Duckwall | 370/462 |
| 5,799,012 | * 8/1998 | Ayerst et al. | 714/748 |
| 6,151,696 | * 11/2000 | Miller et al. | 714/748 |

OTHER PUBLICATIONS

Author Unknown "IEEE Standard for a High Performance Serial Bus" IEEE Std. 1394–1995 pp. 1–372 Aug. 30, 1996.

* cited by examiner

*Primary Examiner*—Salvatore Cangialosi
(74) *Attorney, Agent, or Firm*—Sierra Patent Group, Ltd.

(57) ABSTRACT

In a packet communication system having a node adapted for sending and receiving data packets at a first rate and at a second rate faster than said first rate, the communication system node characterized by sending an acknowledge packet to acknowledge receipt of a data packet, a method for optimizing the acknowledge packet data rate of the node comprising the step of sending acknowledge packets for data packets received at both the first rate and the second rate at the first rate.

14 Claims, 4 Drawing Sheets

METHOD FOR OPTIMIZING ACKNOWLEDGE PACKET RATE

BACKGROUND OF THE INVENTION

1. Field of the Invention

The present invention relates to communications protocols. More specifically, the present invention relates to communications protocols which provide for multi-speed communications such as are employed in the Institute of Electrical and Electronic Engineers 1394 Standard and similar protocols, and to methods for providing acknowledge packets in systems implementing such communications protocols.

2. The Prior Art

The components of a computer system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards, including IEEE Standard 1394-1995, entitled IEEE Standard for a High Performance Serial Bus (hereinafter referred to as 1394). A typical serial bus having architecture meeting 1394 is comprised of a multiplicity of nodes that are interconnected via point-to-point links such as cables that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the IEEE 1394 serial bus standard may be used as an alternate bus for the parallel backplane bus of the computer system, as a low-cost peripheral bus, or as a bus bridge between architecturally compatible buses.

The communications protocol of the IEEE 1394 serial bus standard specifies two primary types of bus accesses: asynchronous access and isochronous access. Asynchronous access may be either "fair" or "cycle-master". The cycle-master form of bus access is used by nodes that need the next available opportunity to transfer data. Isochronous access is used by nodes that require guaranteed bandwidth. The transactions for each type of bus access are comprised of at least one "subaction" wherein a subaction is a complete one-way transfer operation.

According to IEEE 1394, most asynchronous transactions are carried out in two steps. First, a source node sends a packet to a destination node. The destination node then returns an acknowledge packet to the source node. The acknowledge packets are very short, including eight data bits plus the usual 1394 packet overhead of data prefix (140 ns), data end (240 ns), plus 20 ns of dribble bits.

IEEE 1394 allows transmission of packets at a range of speeds. The 1995 standard defines operation at S100, S200, and S400 (approximately 100 Mbits/sec, 200 Mbits/sec, and 400 Mbits/sec respectively), with room for extension later. It has always been assumed that acknowledge packets will be returned at the same data rate as the packet which caused the acknowledge. Thus S100 packets cause the return of S100 acknowledge packets, S200 packets cause the return of S200 acknowledge packets, and S400 packets cause the return of S400 acknowledge packets.

The eight data bits of the acknowledge packets can require about 80, 40, or 20 ns at 100, 200, or 400 Mbits/sec operation respectively at S100, S200, and S400 speeds. Thus the total transmit time for an acknowledge packet, including data prefix, data, dribble, and end states is:

S100≈480 ns
S200≈440 ns
S400≈420 ns

Returning acknowledge packets at the same speed as the data packet being acknowledged provides a slight saving of bandwidth; 40 or 60 ns are saved by transmitting an acknowledge packet at S200 or S400 Mbit rates rather than at the S100 rate.

The new arbitration enhancements being adopted by the 1394a committee provide some bandwidth advantages for returning acknowledge packets at lower speeds.

IEEE 1394a will allow a node to concatenate an unrelated packet onto its acknowledge packet. The unrelated packet may be at a different bit rate than the acknowledge packet to which it is concatenated.

Multi-speed concatenation is affected by backward compatibility considerations, Due to limitations of existing silicon, down-shifting from the S200 and S400 rates to the S100 rate is forbidden. All other possible transitions are allowed.

Thus, in the instance where a node wanted to concatenate an S100 packet onto its acknowledge packet, it would be prevented from doing so if the acknowledge packet had been sent at S200 or S400. Sending the acknowledge packet at S200 instead of S100 will save 40 ns or 60 ns respectively, but missing the concatenation opportunity will cost at least the time required for normal arbitration, typically hundreds of ns.

IEEE 1394a will allow a node to concatenate a packet onto a passing upward (towards the root) bound acknowledge packet. This is very similar to the acknowledge-packet concatenation mentioned previously, but it uses an acknowledge packet generated by some other node entirely. The speed-bandwidth considerations of normal acknowledge-packet concatenation apply here equally; sending an S200 acknowledge packet precludes concatenation of an S100 packet onto the acknowledge packet.

Finally, IEEE 1394a will allow nodes to begin bus arbitration as soon as an acknowledge packet is detected (i.e., transmitted, received and/or repeated), subject to some timing restrictions when a new cycle-start packet is due. See U.S. Pat. No. 5,495,481 to Duckwall describing ack acceleration.

When a high-speed packet is transmitted to a node capable only of some lower speed operation, the high-speed node squelches the data, and sends an extended data prefix, followed by data end. The low-speed node has no way to detect what sort of packet was sent. Acknowledge packet recognition is impossible. And thus it is prevented from using ack acceleration.

This last point is the most important because it does not depend on the arcane problem of backward compatibility. It has to do solely with the existence of low speed nodes on a bus. Currently only S100 and S200 devices are available in production quantities, but with time the mix will undoubtedly shift to a preference for higher speed devices such as S400 and above. High speed acknowledge packets will preclude lower speed nodes from using acknowledge acceleration.

If the lower-speed node eventually has to arbitrate normally, then it may not only add arbitration time, but also the added inefficiency of requiring an extra subaction gap.

This is quite a penalty for saving a few tens of ns on the acknowledge packet itself.

BRIEF DESCRIPTION OF THE INVENTION

The IEEE 1394 standard does not absolutely define the acknowledge packet return speed. If a node returned a lower speed acknowledge packet, the original sending node should receive the acknowledge packet normally, with no ill effects whatsoever, aside from the possible loss of a few tens of ns of bus bandwidth. The present invention takes advantage of this unappreciated fact.

According to the present invention, acknowledge packets are always sent at the speed of the lowest-speed device on the bus. According to a simpler embodiment of the present invention, all acknowledge packets are sent at S100. There is very little penalty for adopting this simple solution.

BRIEF DESCRIPTION OF THE DRAWING FIGURES

Figure 4:
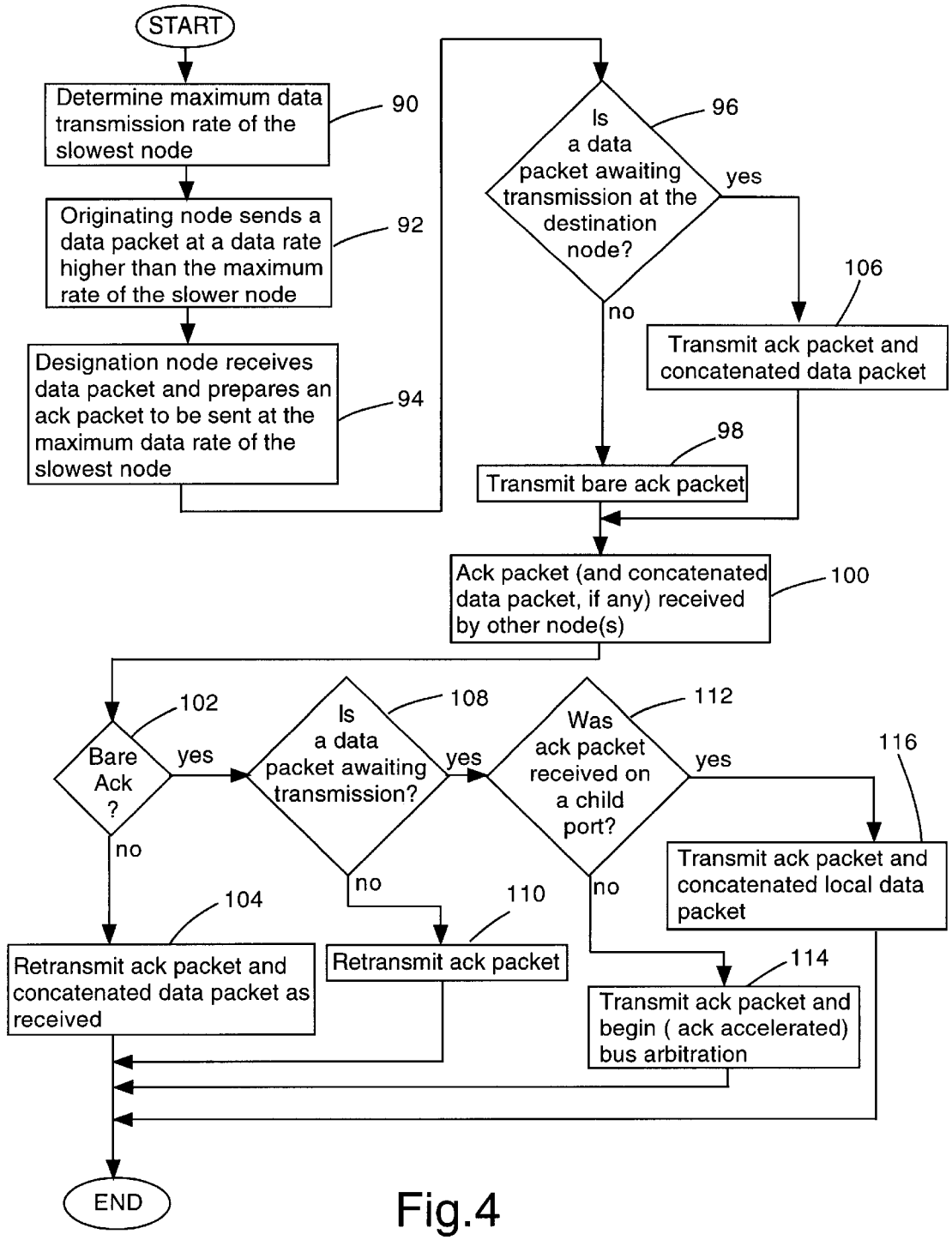

FIG. 4 comprises a flowchart depicting the preferred method of the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
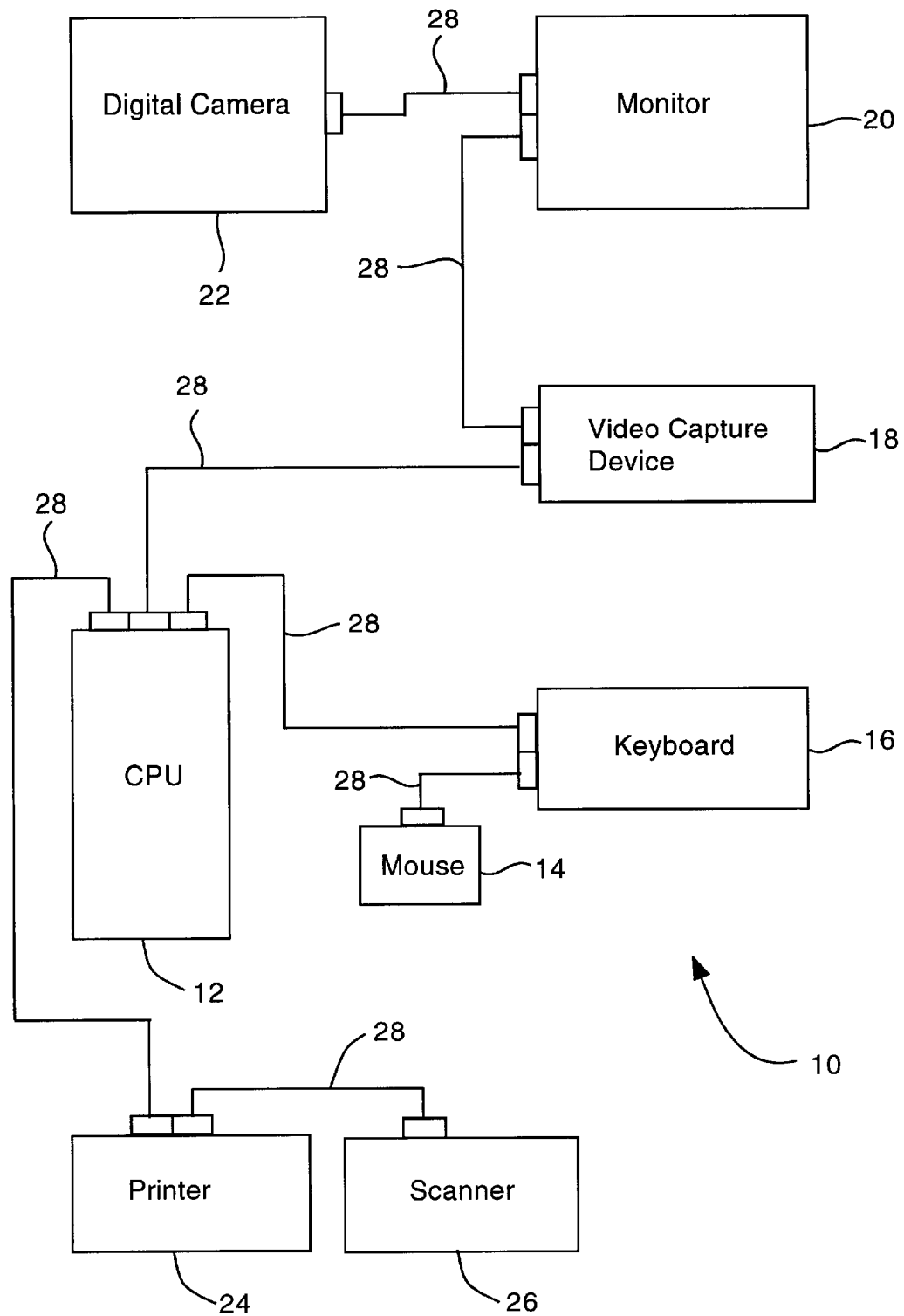
FIG. 1 is a diagram depicting one possible serial network topology incorporating the present invention.

FIG. 1 is a diagram depicting one possible serial network topology incorporating the present invention.

Referring to FIG. 1, a computer system 10 comprises eight devices, a CPU 12, a mouse 14, a keyboard 16, a video capture device 18, a monitor 20, a digital camera 22, a printer 24, and a scanner 26. Each of these devices communicates with other devices in computer system 10 through nodes within each device which are coupled to point-to-point links 28.

Although one reference designation is used herein to designate several point-to-point links 28 depicted in FIG. 1, it is well known to those having ordinary skill in the art that these links may be designed and constructed differently depending on the requirements of the devices on each end of a given point-to-point link 28. The design of particular point-to-point links is not relevant to this disclosure, and thus will not be further described.

Nodes within the various devices have a capability which is related to the level of complexity of the device. For instance, mouse 14, has a low level of complexity and therefore has a simple node, perhaps with a few control registers and no node management circuitry. However, CPU 12, a device having a high level of complexity, has a node controller within the node which manages the transmission and receipt of data by that node.

Node controllers implement serial bus protocols in three layers, the physical layer, the link layer, and the transaction layer.

The transaction layer is responsible for performing read, write and lock operations required when the protocol demands the use of the control and status registers with a given node.

The link layer provides one-way data transfers with the transaction layer, and also provides data checking, data framing, and addressing services.

The physical layer translates link layer information into electrical signals for actual transmission between nodes. The physical layer also ensures that only one node is sending data at a time.

The design and manufacture of transaction, link, and physical layers which meet the requirements of IEEE Std. 1394-1995 is known to those having ordinary skill in the art.

The present invention mandates that an ack packet sent over a bus in response to a data packet is sent at the maximum speed of the slowest device on the bus, or at S100 depending on which embodiment is implemented. Thus, a data packet may be sent at S400 (or higher, as speed enhancements are incorporated), but the ack packet shall be sent at S100, S200, or S400 (or higher, as speed enhancements are incorporated), the maximum speed of the slowest device on the bus.

Figure 2:
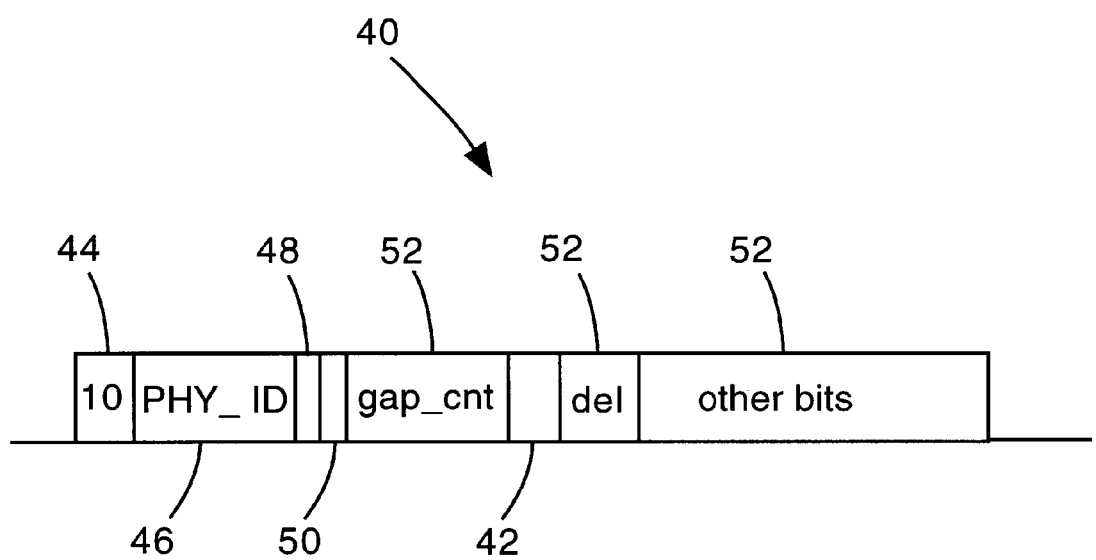
FIG. 2 is a shows a typical self-ID packet according to the IEEE 1394-1995 standard.

In order to determine the maximum speed of the slowest device, a self ID packet 40 as seen in FIG. 2 is sent out when devices are initialized at power up. Although the speed field 42 is most important to the practice of the present invention, other information is present in the self-ID packet which is important to the operation of the network. Such information includes bits 44 identifying the packet as a self-ID packet, the physical ID 46 of the sender of a given packet, the string ID 48, a bit 50 designating whether the node originating the packet has an active link and transaction layer, and other information.

Although 1394 defines the self-ID packet as one or more strings of 32-bits, the length, format, or content of the self-ID packet is not important to the practice of the present invention except that self-ID packet 40 must at a minimum contain the identification of the node originating the packet, and two or more bits designating the maximum speed of that node.

All nodes that conform to 1394 are required to be capable of sending and receiving data at each speed below the maximum speed of that node. Thus, S400 capable nodes must also be capable of sending and receiving data at S200 and S100. Correspondingly, nodes that are S200 capable also must be able to send and receive data at S100. It is contemplated by the inventor that future developments in serial protocols may result in data transmission rates higher than S400. The present invention will still operate as intended regardless of the maximum data transmission rate.

An alternative embodiment of the present invention is contemplated by the inventor which does not require the use of a self-ID packet. In this alternative embodiment, ack packets will all be sent at the minimum speed designated by the specification (S100 in IEEE 1394), thus obviating the need for each node to be aware of the speed of the slowest device on the network.

Figure 3:
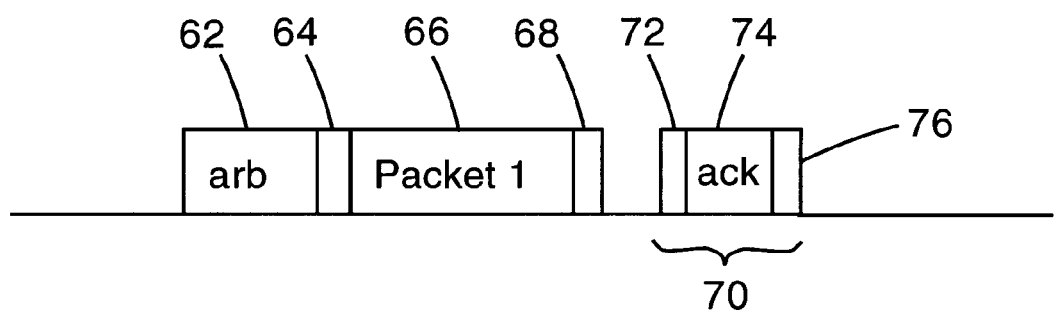
FIG. 3 is a diagram showing one possible prior art data packet transmission/ack sequence.

FIG. 3 is a diagram showing one possible prior art data packet transmission/ack sequence.

Referring to FIG. 3, data sequence 60 originated by the link layer of a given mode comprises an arbitration period 62 which is used by the physical layer to gain control of the network, a data prefix 64, a packet of data 66 containing the source and destination nodes and data to be transmitted, and a data end string 68.

Following receipt of the data at the destination node, a short ack packet 70 is prepared and sent by that destination node, indicating that the data has been received. As defined in 1394, ack packet 70 comprises a data prefix 72, an 8-bit unique identifier 74, and a data end block 76. As is known by persons of ordinary skill in the art, data block 76 may include 2, 4, or 8 dribble bits at S100, S200, or S400 speeds respectively. Again, the particular length and construction of an ack packet is not critical to the practice of the present invention. Rather, it is the speed that the ack packet is sent that is critical to the practice of the present invention.

In the prior art, ack packet 70 would typically sent at the same speed as the associated data packet was sent. Thus, a data packet sent at S400 would cause the associated ack packet to be sent at S400. Correspondingly, a data packet sent at either of S100 or S200 would cause the associated ack packet to be sent at S100 or S200 respectively.

According to the prior art, each node in the network has a maximum speed associated with it. High speed capable nodes never send lower speed capable nodes packets which are too fast. For example, an S100 node will never receive an S200 or S400 packet. In the circumstance where a first high speed node is connected to one or more high speed nodes and one or more low speed nodes and the first high speed node needs to transmit information to its high speed peers, the first high speed node transmits the high speed information over the high speed nodes, but simultaneously transmits an extended data prefix to the low speed nodes. This extended data prefix is terminated with a data end signal which is transmitted to both high speed and low speed peers simultaneously. This scheme keeps the arbitration timers of the low speed nodes synchronized with the rest if the nodes on the bus; however, the low speed node has no way of knowing the nature of the packet it missed. In particular, the low speed node has no way of identifying a high speed ack packet, and therefore is prohibited from fly-by arbitration and ack accelerated arbitration.

Using the method of the present invention, however, the ack packet is sent at the speed of the slowest node, allowing the slowest node to immediately know when the ack packet has been sent, and thus that the bus is free.

FIG. 4 comprises a flowchart depicting the preferred method of the present invention.

Referring to FIG. 4, the method begins with step 90 when the maximum data transmission rate of the slowest node is determined. One way to accomplish this step is to have each node on the network transmit a self-ID packet containing speed information such as seen in FIG. 1. Such a step is typically, but not necessarily, performed at startup. Each node may then store that information locally.

The method proceeds with step 92 when a data packet is originated by a node on the network. Data packets typically contain information identifying the destination node. However, in order to ensure that all nodes remain synchronized, data packets destined for a particular node on the network are transmitted in all directions away from the source node, thus passing through each node on the network, regardless of whether a given node is required to operate on any particular data packet. In the present invention, the data packet is originated and retransmitted at a transmission rate greater than the maximum speed of the slowest node in the network.

The method then proceeds with step 94 when the destination node receives the data packet and prepares an acknowledge packet for transmission to the originating node. Recall that this ack packet is sent so that the originating node may "know" that the data packet was received. The destination node prepares the ack packet for sending at the maximum data rate of the slowest node previously determined at step 90.

In an alternative embodiment contemplated by the inventor, step 90 is not performed and the ack packet prepared at step 94 is sent at the minimum speed possible within the network, such as at S100 seen in 1394.

At step 96, it is determined whether a data packet is awaiting transmission at the destination node.

If, at step 96, it was determined that no data is awaiting transmission at the destination node, the bare ack packet is transmitted at step 98 which is received at step 100 by an intermediate note. Here, the term intermediate node is defined as any node other than the originating node or the destination node. Persons having ordinary skill in the art readily recognize that ack packets and data packets are transmitted to each node in the network, despite the fact that an ack packet and a data packet each are adressed to specific nodes to which they pertain.

At step 102, it is determined whether the packet received at the intermediate node is a bare ack packet, or whether the packet received is a concatenated packet containing an ack packet and a data packet.

If, at step 102, the packet received is a concatenation of an ack packet and a data packet, the data packet, at step 104, is retransmitted as received. Recall that data is only retransmitted if the node receiving the data is an intermediate node. Persons having ordinary skill in the art readily recognize that a node having no child nodes will never retransmit data, since there is only one active port for that node. Correspondingly, nodes having only one child node and no parent nodes also do not retransmit packets received over its only node. The details of the operation of nodes in different positions may be found in the 1394 specification, and are not presented here in order to avoid overcomplicating the disclosure.

If, at step 96, a data packet was awaiting transmission at the destination node, the incoming ack packet and the data packet, at step 106, are concatenated into a new data packet, and retransmitted.

If, at step 102, the packet received at an intermediate node is an ack packet having no concatenated data, the method proceeds with step 108 where it is determined whether a data packet is awaiting transmission.

If, at step 108, it was determined that no data is awaiting transmission at the destination node, the bare ack packet is retransmitted at step 110.

If, at step 108, it was determined that data is awaiting transmission, the method proceeds with step 112 where it is determined whether the ack received at step 100 came in on a child port of the intermediate node. If no, ack acceleration is allowed, and the method proceeds with step 114 where the ack packet is retransmitted and accelerated bus arbitration is started in order to be able to transmit the waiting data packet.

If, at step 112, it was determined that the ack packet came into the intermediate node on a child port, the method proceeds with step 116 during which the ack packet is concatenated with the data packet, and retransmitted.

Persons having ordinary skill in the art will readily recognize that the data packet arriving at an intermediate node may simply be an ack packet, or may include other data, depending on whether either of steps 98 or 106 are performed.

Correspondingly, it is possible for the data packet arriving at the originating node to either be a simple ack packet, or alternatively include another data packet. If it includes another data packet, that data packet may either be from the destination node, or may be completely unrelated, having been originated from a device other than the node but traveling a similar path to the originating node. A third possibility is that a data packet concatenated to the ack packet at an intermediate node may be destined for a node other than the originating node. In this case, the resulting concatenated data packet may travel between one or more intermediate nodes, the ack portion of the concatenated packet being recognized by the node expecting it, and the data portion being recognized and utilized by the node addressed by the data portion of the concatenated data packet.

Logically the speed of the ack packet is determined by the link layer, but it could also be determined by the physical layer.

The speed of packet transmission is set when the link layer sends a bus request to the physical layer. This bus request includes a speed field. This speed field has two effects: (1) it sets the speed of transmission to S100, S200, etc., and (2) it sets the "width" of the data bus between the physical layer and the link layer. The data bus is keyed to a 50 MHz clock, and is nominally 8 lines wide. However for S100 operation, only two lines are active; for S200 operation, four lines are active; and for S400 operation all eight lines are active. Other numbers of lines and other speeds may be used, without exceeding the intended scope and purpose of the present invention.

According to the present invention, the link layer always sets the speed field for immediate (ack) requests to the transmission rate of the slowest node, or S100, depending on which embodiment is implemented. This insures the physical layer will transmit all acknowledge packets at the transmission rate of the slowest node, or S100, whichever is appropriate.

Alternatively the link layer may transmit data to the physical layer at the highest speed possible within that node, but the physical layer shall be set to transmit all ack packets at either the transmission rate of the slowest node, or S100, depending on which embodiment is implemented.

For future designs where the physical layer and link layer silicon are integrated into one integrated circuit, the physical layer part of the design will still receive in some form an immediate bus request from the layer and bus requests will generally have some form of speed indication. The same two solutions are possible; either the link layer portion of the design can simply send all acknowledge packets at the speed of the slowest node (or S100, whichever applies), or the link layer portion of the design can transfer the acknowledge packet to the physical layer at some higher speed, and the physical layer portion of the design can slow it down for transmission to other nodes.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a packet communication system having a node adapted for sending and receiving data packets at a first rate and at a second rate faster than said first rate, the communication system node characterized by sending an acknowledge packet to acknowledge receipt of a data packet, a method for optimizing the acknowledge packet data rate of the node comprising the step of sending acknowledge packets for data packets received at both the first rate and the second rate at said first rate.

2. The method of claim 1 wherein said packet communication system conforms to IEEE Std. 1394, said first rate is S100 and said second rate is S200.

3. The method of claim 1 wherein said packet communication system conforms to IEEE Std. 1394, said first rate is S100 and said second rate is S400.

4. The method of claim 1 wherein said packet communication system conforms to IEEE Std. 1394, said first rate is S200 and said second rate is S400.

5. The method of claim 1 wherein said packet communication system conforms to IEEE Std. 1394, said first rate is S100 and said second rate is greater than S400.

6. The method of claim 1 further including the step of
determining the maximum data transmission rate of the slowest communication system node, and
wherein said first rate is approximately equal to said maximum data transmission rate.

7. The method of claim 6 wherein said packet communication system conforms to IEEE Std. 1394, said first rate is S100 and said second rate is S200.

8. The method of claim 6 wherein said packet communication system conforms to IEEE Std. 1394, said first rate is S100 and said second rate is S400.

9. The method of claim 6 wherein said packet communication system conforms to IEEE Std. 1394, said first rate is S200 and said second rate is S400.

10. The method of claim 6 wherein said packet communication system conforms to IEEE Std. 1394, said first rate is S100 and said second rate is greater than S400.

11. In a packet communication system having a node adapted for sending and receiving data packets at a first rate and at a second rate faster than said first rate, the communication system node characterized by sending an acknowledge packet to acknowledge receipt of a data packet, a method for optimizing the acknowledge packet data rate of the node comprising the steps of:
receiving a first data packet transmitted at the first rate;
sending an acknowledge packet for said first data packet at said first rate;
receiving a second data packet transmitted at the second rate; and
sending an acknowledge packet for said second data packet at said first rate.

12. In a packet communication system having a node adapted for sending and receiving data packets at more than two different data transmission rates, the communication system node characterized by sending an acknowledge packet to acknowledge receipt of a data packet, a method for optimizing the acknowledge packet data transmission rate of the node comprising the step of sending acknowledge packets for data packets received at any data transmission rate at the lowest data transmission rate.

13. In a packet communication system having a node adapted for sending and receiving data packets at three different data transmission rates, the communication system node characterized by sending an acknowledge packet to acknowledge receipt of a data packet, a method for optimizing the acknowledge packet data transmission rate of the node comprising the step of sending acknowledge packets for data packets received at any one of said three different data transmission rates at the lowest data transmission rate.

14. The method of claim 13 wherein said packet communication system conforms to IEEE Std. 1394, said three different data transmission rates are S100, S200, and S400, and said ack packets are sent at S100.

* * * * *